United States Patent Office 2,864,780
Patented Dec. 16, 1958

2,864,780

TRANSPARENT RESINOUS SUBSTANCE

Irving Katz, Long Beach, Calif., and Frederick L. Thomas, Madison, Wis., assignors to Bjorksten Research Laboratories, Inc., Madison, Wis., a corporation of Illinois No Drawing. Application December 10, 1954
Serial No. 476,565

1 Claim. (Cl. 260—18)

This invention relates to transparent laminates and more particularly to an improved interlayer material for such laminates which has a particularly wide range of workable temperatures together with high shatter resistance.

This application is a continuation-in-part of application Serial No. 256,834 filed November 16, 1951, now abandoned.

Heretofore, it has been the practice to laminate glass or acrylate plastics with resilient interlayers, such as polyvinyl butyral, cellulose acetate, cellulose nitrate, polyvinyl chloride, polyvinyl acetate, their copolymers, and the like, and polyvinyl butyral has been one of the most widely accepted and used of such interlayer materials.

However, while polyvinyl butyral is a desirable and suitable material for these purposes in many instances, it suffers from the drawback that at temperatures above 50° C. its mechanical properties are poor, so that it is incapable of performing the desired functions. Particularly, in fast-flying aircraft air friction creates skin temperatures above this range, in consequence of which polyvinyl butyral interlayers become useless in such fast-flying aircraft.

Polyurethanes might be suitable materials for such interlayers, except that polyurethanes of prior art suffer various defects, such as low tensile strength at 90° and brittleness at low temperatures.

In one previous work on polyurethanes, castor oil, glycols and diisocyanates have been reacted, but in spite of a great deal of research on this subject, it has never been possible to achieve transparency or optical clarity, nor tensile strengths higher than about 175 p. s. i. at 90° C., and at the same time flexibility at low temperatures. Compounds flexible at 0° F. would be sticky at normal temperatures or lack tensile strength at 90° C.

Castor oil had been used alone and with glycols, with meta tolyldiisocyanate, and glycols had been used with hexamethylene diisocyanate in the absence of castor oil, to produce fibers and the like.

We have now discovered that a novel series of transparent flexible polyurethanes is obtained, which has surprisingly and unexpectedly greatly improved physical and mechanical properties, together with transparency, when esters of ricinoleic acid, such as, for example, glyceryl mono-, di- and tri-ricinoleate and mixtures of acetylated triricinolein—predominately mono-acetylated ricinolein—are reacted with polymethylene diisocyanate having from 2 to 10, or preferably 4 to 8, carbon atoms, and a polymethylene dihydric alcohol having from 2 to 10, and preferably 2 to 6, carbon atoms.

The process of manufacturing laminated forms for aeronautical use requires that the laminate be preheated at an elevated temperature before molding into the complex form required for such use. Thus, a laminate interlayer for this application must remain sufficiently pliable and soft during the forming operation to permit forming to be carried out, and at the same time must have superior properties in the final article.

It is therefore an object of this invention to provide interlayer materials for laminates, as well as laminates made therefrom, which will have an operable range up to 210 degrees F., and higher, and down to sub-zero temperatures. Another object is an improved plastic laminate. Another object is a resilient, transparent interlayer assembly. Another object is a process for preparing plastic laminates. Other objects are new polyurethanes. Another object is a transparent resinous polymer, having a high tensile strength and comprising polyurethane. Another object is such a polymer having a high impact strength at low temperature. Further objects will become apparent as the following detailed description proceeds.

In accordance with our invention, diisocyanate molecules are reacted with large trifunctional molecules, preferably having a molecular weight larger than 370 preferably acetylated castor oil and polyhydric alcohol molecules; the polymeric reaction product is separated from by-products and solvents and is cured at elevated temperatures to produce a new polymeric material of superior properties. This material may be formed into sheets and laminated together with sheets of glass or of a resin comprising a polymer of methacrylic acid or acrylic acid or an ester of one of these acids.

Tri-functional molecules which may be suitable may have three or more isocyanate reactive attached groups, such as hydroxy or amino groups and have a molecular weight greater than ten times the molecular weights of the combined monomers.

To illustrate our invention, to make clear its nature, and to set forth certain embodiments, but not to define the limits of its scope, the following examples are presented. All parts shown are by weight.

*Example 1*

Acetylated castor oil, for use in subsequent experiments, was prepared as follows:

503 gms. of pure castor oil (Bakers AA grade, or U. S. P.) and 88 gms. of acetic anhydride, were added to a 1-liter three necked flask, equipped with heating mantle and motor stirrer with a Tygon shaft and bearing seal, reflux condenser and thermometer. The anhydride was added over a period of two hours from a separatory funnel. The temperature was maintained uniformly at 105 to 110° C. Heating was continued for about 3 hours. The mixture was allowed to cool to room temperature (approximately 1½ hours) and to stand sealed for 17 hours (overnite). It was then heated one hour to 110° C. and a sample titrated with sodium hydroxide. The acid number was 98 to 100. The acetic acid was distilled off. Approximately 23 to 25 gms. of acetic acid were recovered at 10 mm. Hg pressure. The temperature was 80° C. at start to 100° C. at finish of reaction in two hours. The reaction mixture darkened and then became lighter. The yield of acetylated oil was 546 gms. or 96% by weight. The acetyl content of the resulting product was 38% of all hydroxyls.

The product was then neutralized with 2-N sodium hydroxide to phenolphthalein end point. The emulsion was salted out with sodium hydrogen sulfate. Sodium sulfate saturated solution with pH 4.4 was added to the resulting water layer. It was washed six times with equal parts of distilled water, shaken thoroughly, then dried over 25% by weight of oil of anhydrous sodium sulfate for 48 hours, to a final water content of 1%, and was then further dried by vacuum distillation at 100° C. for 4 hours.

Example 2

350 parts castor oil
150 parts acetylated castor oil (prepared as in Example 1)
260 parts pentane diol-1,5
602 parts m-tolylene diisocyanate The above ingredients were reacted in 760 parts of methyl ethyl ketone for 1 hour at an average temperature of 80° C. The resultant polymeric product was separated and purified and cured for 3 hours at an average temperature of 60° C., and an average pressure of 50 mm. of mercury. Sheets made of the cured product were found to have a high tensile strength, a softening point of greater than 185° C., and to be very clear and flexible at 10° F.

Example 3

268 parts castor oil
108 parts acetylated castor oil (prepared as in Example 1)
188 parts pentane diol-1,5
436 parts m-tolylene diisocyanate The above ingredients were reacted for 1 hour with 550 parts of methyl ethyl ketone at an average temperature of 79° C. The resulting resin was poured on a glass plate and baked under a vacuum. The initial temperature was 30° C. at atmospheric pressure and the temperature was slowly raised to 90° C. and pressure slowly dropped to 22 mm. of mercury. The resin was baked 8 hours.

The tensile strengths of the above resins in examples 2 and 3 are:

25° C.>1400
50° C.>800
90° C.>250

Example 4

Either of the above compositions can be used except that no solvent is used. The intermediates used are carefully purified by distillation and alkaline treatment to reduce acid number and evacuated under heat to remove moisture. A clear resin, free of gas bubbles, results with physical properties similar to Examples 1 and 2.

Example 5

199 parts of butane diol 1,4; or 295 parts hexane diol 1,6; or 435 parts of decane diol 1,10 can be used all, or in part, to replace pentane diol 1,5 in Example 3.

Example 6

100 parts castor oil
114 parts m-tolyl diisocyanate
110 parts alcohol-soluble nylon (solid) saturated solution in
300 parts dimethyl formamid (as solvent)

The above ingredients were reacted for 15 minutes at 70° C. The resultant polymeric material was removed from the excess nylon and from the solvent and was cured for 1½ hours at 100° C. Sheets made of the cured material had a tensile strength of 700 p. s. i. at 90° C. and were tough, flexible and transparent.

Example 7

366 parts of castor oil
117 parts of perfluorinated butane diol 1,4
228 parts of trifluoro methyl meta tolyl diisocyanate were mixed and reacted at 160° C. for 15 minutes to 30 minutes, depending upon the properties desired in the final compound. 700 parts of penta chloro trifluoro propane was employed as a solvent. The solvent was removed by vacuum distillation.

The resins were poured on a glass plate with no lubricant or parting agent and baked 2 hours at 100° C. Additional baking did not appear to appreciably increase its strength.

Example 8

366 parts of castor oil
101 parts of tartaric acid ethylene glycol polyester (made by heating 150 parts of tartaric acid with
90 parts of tetramethylene glycol)
174 parts of m-tolylene diisocyanate
640 parts of methyl ethyl ketone The polyester was added to remainder in methyl ethyl ketone. The mass was brought to 140° C., heated 15 minutes and baked 4 hours at 100° C.

A resin with tensile strength greater than 600 p. s. i at 90° C. resulted which was optically clear and non-tacky. It was somewhat brittle at sub-zero temperatures but flexible at +10° F. to room temperature. It can be modified by the additives developed above for the polyurethans.

Example 9

366 parts castor oil (Fed. Spec. #1)
59 parts hexane diol 1,6
172 parts hexane diisocyanate 1,6
600 parts methyl ethyl ketone were reacted by heating 8 minutes from 25° C. to 140° C., and 17 minutes at 140° C., allowing the solvent to escape. 37.2 parts glyceryl mono ricinoleate were added and mixed vigorously. The reaction mixture was heated a few minutes longer until gelation. The macro gel was removed and milled on a hot and cold roll mill at 300° F. It formed a continuous homogeneous sheeting suitable for further compounding in plastic art. For example, it was blended with equal parts of the same composition but in which the glyceryl mono ricinoleate was added after 15 minutes' heating at 140° C. This reaction product was a thermoplastic viscous liquid. To 100 parts of these two resins blended in equal weights, 5½ parts of hexane diisocyanate 1,6, dissolved in 20 parts of dimethyl formamide, was added. The resultant composition was milled 15 minutes at 300° F. This material formed a transparent, high molecular weight, high tensile strength, elastic resin.

Example 10

The ingredients of the reaction product in Example 2 were polymerized for 40 minutes. The viscosity as measured by Zahn cup #2 was within the range of 15 to 60 seconds. During this phase the reaction mixture was poured on 12″ x 12″ polymethyl methacrylate sheeting edged with aluminum strips. The sheeting was placed in a vacuum autoclave and the polymerization was continued at 30 to 65° C. and 650 to 720 mm. of mercury pressure for 1 hour. The vessel was opened and a similar sheet of methacrylate sheeting was pressed onto the partially polymerized resin. The heating was then continued as in Example #8. The resultant laminate was shatterproof on bullet impact from 0° to +200° F.

Example 11

129 parts di methyl di chloro silane
162 parts potassium cyanate were reacted in a closed vessel under reflux for 24 hours. The product was distilled under vacuum, obtaining an oil identified principally as di methyl silane diisocyanate. This diisocyanate is useful in forming methane resins as the isocyanate reagent in the preceding experiments.

Example 12

The reaction product of hydrazine and phosgene, in which the latter is passed thru a solution of the former in carbon tetrachloride, is fractionally distilled. A liquid, predominantly diisocyanate, is recovered, having the formula O=C=N—N=C=O.

840 parts of this liquid
57 parts ammonia dissolved in benzene were reacted to form an extremely hard resin. This high melting material is useful before or after its formation as a blending composition to increase the concentration of urethan linkages in polyurethan reaction mixture and resins.

*Example 13*

840 parts diisocyanate O=C=N—N=C=O
48 parts dihydroxy methane or hydrated formaldehyde formed by reacting equal molal portions of water and formaldehyde under high pressure and low temperature were reacted to form an extremely hard, high melting point, resin, useful as in Example 12.

In any of the above examples, we may add ingredients useful for the improvement of the properties of the composition, or to facilitate handling. For example, methyl salicylate, methyl anthranilate, and the like, may enhance the resistance to ultraviolet radiation; dodecyl nitrile and analogues in amounts of .25 to 15% may improve the optical clarity; and dimethyl formamide, diethyl formamide and dibutylformamide may be useful coupling and compatibility increasing agents, which facilitate compounding of these resins, for example, with nylons or other polyamide resins. Pigments, fillers and dyes, and the like, may also be added.

The analogous reactions with corresponding fluorinated compounds are included in this invention. For example, we may employ in the reactions fluorinated glycols having from 2 to 10 carbon atoms, such as for example—

(1) Tri fluoro mono chloro ethylene glycol
(2) Tetra fluoro ethylene glycol
(3) Mono fluoro ethylene glycol
(4) Hexa fluoro propylene glycol 1,2
(5) 1,1 di fluoro ethylene glycol
(6) Hexa fluoro propylene glycol
(7) Octa fluoro butane diol 1,3
(8) Octa fluoro butane diol 1,4
(9) Per fluoro hexane diol 1,6
(10) 1.1 di fluoro hexane diol 1,6
(11) 1.1–2 tri fluoro 2-ethyl hexane diol 1,3
(12) 2-per fluoro ethyl hexane diol 1,3
(13) 2,3 di fluoro 2 methyl pentane diol 1,4
(14) Penta fluoro tri methyl hexane diol 1,6 with fluorine containing polyfunctional derivatives, such as fluorinated triricinolein, glyceryl monoricinoleate, diricinoleate, and mono and di esters of pentaerythritol with trifluoro acetic acid or trifluoro acetic anhydride; and fluorine containing diisocyanates, such as tri fluoro methyl phenyl diisocyanate, mono-fluoro di chloro methyl tolyl diisocyanate, and the like; and with trifunctional compounds containing at least 3 active hydrogens; and with diisocyanates, such as those mentioned elsewhere in this application in conjunction with non-fluorinated glycols.

The fluorine containing polyfunctional derivatives may similarly be reacted with the non-fluorinated glycols and diisocyanates referred to elsewhere in this application; and the fluorinated diisocyanates with non-fluorinated polyfunctional derivatives, and glycol. The preferred ratio, in these reactions also, is to employ isocyanates and hydroxy derivatives in the ratio of .9 to 1.2 of isocyanate groups to hydroxyl groups, and to have 20 to 80% of all hydroxyl groups in the form of the said polyfunctional derivative, where the active hydrogens are three or more.

Generally, we contemplate the reaction products of diisocyanates, dihydric alcohols, and acetylated castor oil. Broadly, we might suitably use in place of acetylated castor oil compounds of the type

in which Y is an organic compound, preferably having a molecular weight between 80 and 1200 and R, R' and R" are hydroxy, amino, amide, carboxy, amino groups, or beta carbonyl esters.

Any of the above transparent compositions is suitable for use as an interlayer in sandwich type construction, having adhesion to glass and metals, particularly if polymerized in contact therewith.

In the reaction between hydroxy polyfunctional materials having a molecular weight above 370, particularly acetylated castor oil, a difunctional isocyanate, preferably selected from the group consisting of tolylene diisocyanates, naphthalene diisocyanates and aliphatic diisocyanates having from 2 to 10 carbon atoms, and a glycol type ingredient, the advantageous physical properties stated are best obtained when we employ these ingredients in such ratio that the ratio of the number of isocyanate groups to hydroxyl groups present is approximately .9 to 1.2, and the number of hydroxyl groups in the polyfunctional substance are from 20% to 80% of all hydroxyl groups present.

We may employ hydroxy polyfunctional products having a molecular weight between 17 and 370 or higher, such as for example, 1,2,3, tri amino propane and glycerine; hexane triol 1,2,6, trimethylol propane, penta erythritol, sorbitol, mannitol, diethylene triamine, tri ethanol amine, gluconic acid, tartaric acid, citric acid and cyanuric acid, melamine, N,N',N" tri methyl melamine, phloroglucinol and beta hydroxy ethyl resorcinol, ammonia, phosphoric acid, boric acid, (3,4 di hydroxy phenyl) alanine, tetra methylol cyclohexanol, resorcinol alkylated with Nopol (methylol pinene), hydrogenated products of resorcinol alkylated with Nopol, phenol alkylated with two moles of phytol, alkylated resorcinols (hydrated) (reaction products of resorcinol with 2-methyl pentadiene hydrated to one alkyl hydroxyl), alkylated resorcinols (hydrated), reaction products of resorcinol with isoprene hydrated to one alkyl hydroxyl, reaction product of resorcinol with butadiene, reaction product of resorcinol with isoprene, reaction product of the alkylation of phenol with vinyl tri ethoxy silane.

In these cases, the best results are obtained by reaction with an aryl diisocyanate, meta tolylene diisocyanate, or polymethylene diisocyanates having from 2 to 10 carbon atoms, and dihydric alcohols having from 2 thru 10 carbons, such as, hydrated formaldehyde, ethylene glycol, trimethylene glycol, propane diol 1,2, butane diol 1,4, butane diol 1,3, butane diol 2,3, pentane diol 1,5, pentane diol 2,4, hexane diol 2,5, octane diol 1,8, octane diol 2,8, decane diol 1,10, styrene glycol, penta erythritol di acetate, penta erythritol di propionate, penta erythritol dibutyrate, penta erythritol mono acetate, monobutyrate, penta erythritol di caproate, penta erythritol di caprylate, 2.2' bis para hydroxy di phenyl butane, p, p' bi phenol, 1-cyclo hexyl amino 2 propanol, glycine, alanine, phenyl alanine, leucine, tyrosine, p, p' methylene-di-aniline, catechol, resorcinol, octyl cyclo hexane glycol 1,3, octyl resorcinol, hydroquinone, malonic acid, maleic acid, succinic acid, adipic acid, sebacic acid, salicylic acid, phenyl salicylic acid, dl alpha amino butyric acid, di hydro forbisen or bis 4-4' (N-methyl, 2-N-phenyl, 3 hydroxy, 5-methyl pyrazole, phenol alkylated with one mole of phytol);

Fatty acid amines, such as Armour & Company's Armine 18D, Armine 10D, Armine 12D, Armine 14D, Armine 16D, Armine 18D, Armine CD which are aliphatic, straight chain amines having from 8 to 18 carbon atoms;

Fatty acid amines reacted with ethylene oxide, such as Armour & Company's Ethomeens—Ethomeen C/60

(purified), Ethomeen C/15 (purified), Ethomeen 18/15, Ethomeen T/60, Ethomeen T/15;

Fatty acid amides reacted with ethylene oxide—Ethomid C/15, Ethomid C/20, Ethomid C/25, Ethomid C/60, Ethomid HT/15, Ethomid HT/25, Ethomid HT/60, and the like;

Also with dihydric compounds having molecular weights greater than 370, such as, pentaerythritol di hexoate, penta erythritol di octoate, penta erythritol di laurate, penta erythritol di palmitate, penta erythritol di oleate, penta erythritol di stearate, penta erythritol di acetyl ricinoleate; commercial polyethylene glycols known as "Carbowaxes," polyesters with terminal hydroxyls from above glycols and succinic anhydride, hydrated di cyclo pentenyl alcohol polyesters with terminal hydroxyls from soya dimer acid (purified) and above glycols; mixed diesters of penta erythritol with stearic, oleic and palmitic acids, mono phenylurethan of triricinolein, mono acetyl ester of triricinolein, mono phenyl urethan of 12 hydroxy tri stearin, mono acetyl ester of 12 hydroxy tri stearin; the acetylated esters of hydrogen peroxide treated tri olein containing two free hydroxyl groups; polyamides, such as, soya dimer acid polyamide "Norolac."

It is thus seen that the invention is broad in scope, and is not to be restricted excepting by the claim, in which it is our intention to cover all novelty inherent in the invention as broadly as possible, in view of prior art.

Having thus disclosed our invention, we claim:

As a composition of matter, the polymeric product of the reaction between castor oil, acetylated castor oil having an acetyl content about 38 percent of the hydroxyl content, pentane diol-1,5, and m-tolylene diisocyanate.

References Cited in the file of this patent

Chemical Engineering, April 1950, pages 165 and 166.
The Chemical Age, March 31, 1951, pages 481–484.

UNITED STATES PATENT OFFICE
CERTIFICATE OF CORRECTION

Patent No. 2,864,780                          December 16, 1958

Irving Katz et al.

It is hereby certified that error appears in the printed specification of the above numbered patent requiring correction and that the said Letters Patent should read as corrected below.

Column 3, line 55, for "110 parts" read -- 100 parts --.

Signed and sealed this 7th day of April 1959.

(SEAL)
Attest:

KARL H. AXLINE
Attesting Officer

ROBERT C. WATSON
Commissioner of Patents